Aug. 2, 1927.
W. MANNSDORFF
1,637,830
POTATO PEELING MACHINE
Filed Oct. 21, 1925    2 Sheets-Sheet 2
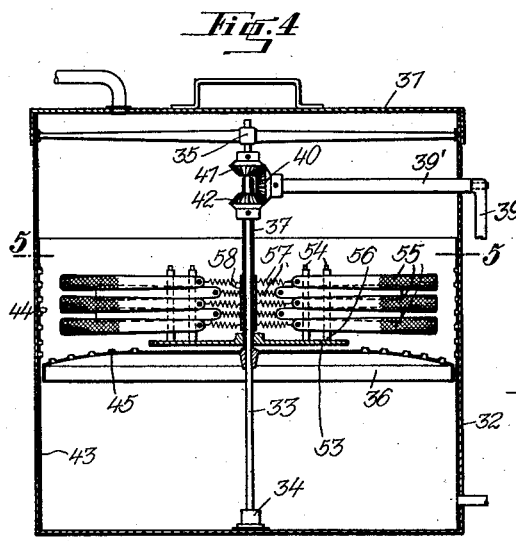
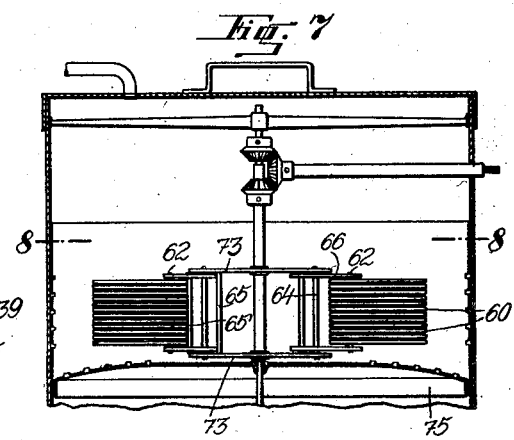
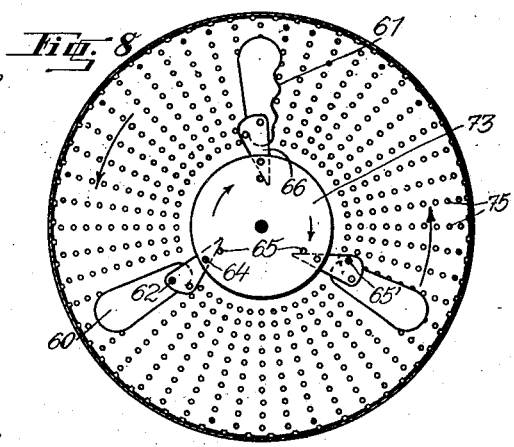
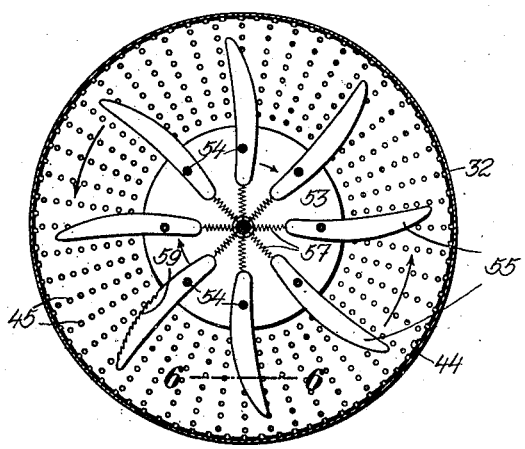
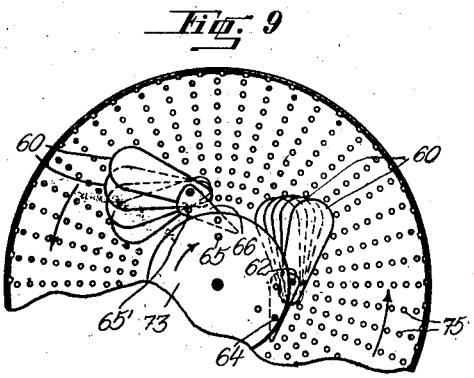
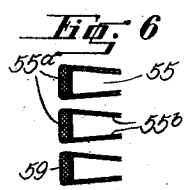

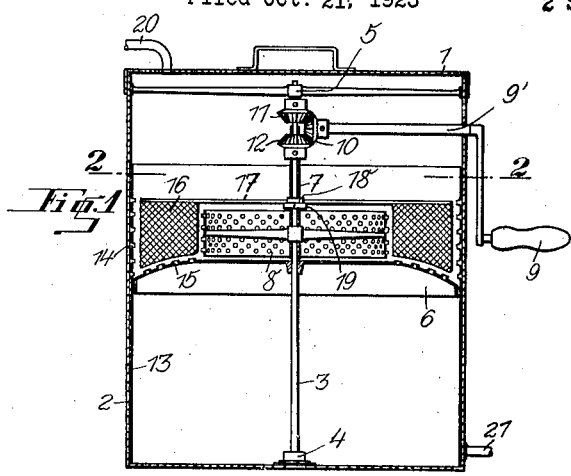

Patented Aug. 2, 1927.

1,637,830

UNITED STATES PATENT OFFICE.

WOLDEMAR MANNSDORFF, OF CHARLOTTENBURG, GERMANY.

POTATO-PEELING MACHINE.

Application filed October 21, 1925, Serial No. 63,884, and in Germany November 10, 1924.

My invention relates to improvements in potato peeling machines, and more particularly in machines of the type comprising a stationary cylinder and a rotary bottom cooperating therewith and both having a greater surface, the potatoes being alternately thrown by centrifugal action from the bottom towards the cylinder and from the cylinder towards the bottom, so that the potato is peeled. The object of the improvements is to provide a machine of this type having an increased peeling effect, and with this object in view I provide the said machine with subsidiary peeling members adapted to be rotated in a direction opposite to that of the bottom. Thereby the potatoes are peeled not only by being thrown from the bottom towards the cylinder and back again, but peeling is assisted by the potatoes being thrown from the stationary cylinder against the additional rotary peeling members and from the said peeling members against the stationary cylinder or the rotary bottom. By rotating the said additional members in opposition to the rotary bottom a certain resistance is opposed to the potatoes being carried along by the said additional members or the rotary bottom, which results in effective peeling. By the cooperation of the grater surface of the bottom and the stationary cylinder or the rotary additional members the potatoes are made to rotate in a direction opposite to that which the grater surfaces intend to impart thereto, which likewise improves the peeling of the potatoes.

The said additional grater member may be in the form of a rotary cylinder disposed concentrically within the stationary cylinder, in which case I prefer to subdivide the annular space provided between the said cylinders by radial partitions loosely rotatable within the said space.

In a modification the said additional grater members are in the form of sets of arms disposed within the said space one above the other and rockingly mounted independently of each other, the said arms being normally held substantially in radial positions and into the path of the potatoes by centrifugal action and in some cases by springs.

For the purpose of explaining the invention several examples embodying the same have been shown in the accompanying drawings, in which the same reference characters have been used in all the views to indicate corresponding parts. In said drawings, Fig. 1, is a sectional elevation showing the potato peeling machine, Fig. 2, is a sectional plan view taken on the line 2—2 of Fig. 1, Fig. 3, is a detail sectional plan view showing one of the chambers of the peeling machine shown in Figs. 1 and 2, Fig. 4, is a sectional elevation similar to the one shown in Fig. 1 and showing a modification, Fig. 5, is a sectional plan view taken on the line 5—5 of Fig. 4, Fig. 6, is a detail sectional view taken on the line 6—6 of Fig. 5 and showing the grater arms on an enlarged scale, Fig. 7, is a sectional elevation showing another modification of the machine, Fig. 8, is a sectional plan view taken on the line 8—8 of Fig. 7, and Fig. 9, is a similar sectional plan view showing the grater members in other positions.

In the example shown in Figs. 1 to 3 my improved peeling machine comprises a cylindrical receptacle 2 adapted to be closed by a lid 1 and having an internal lining 13 formed with a grater surface 14, a rotary shaft 3 mounted in a step bearing 4 and in a bearing 5, a bottom 6 fixed to the rotary shaft 3 and adapted to be rotated thereby and having an annular grater surface 15, and a tubular shaft 7 placed on the shaft 3 and carrying a grater cylinder 8 disposed concentrically within the grater surface 14. The shaft 3 and the tubular shaft 7 are adapted to be rotated in opposite directions by means of gear wheels 11 and 12 respectively secured thereto and a gear wheel 10 carried by the shaft 9' of a crank 9.

On a collar 19 fixed to the tubular shaft 7 the hub 18 of a star wheel 17 is rotatable, and the arms of the said star wheel carry partition walls 16 extending into the annular chamber provided between the grater surfaces 14, 15 and 8 and dividing the same into sectional chambers. In the example shown in the figures I provide the star wheel with four arms and partitions 16 dividing the annular chamber into four sectional chambers. As appears from the figures there is a certain clearance between the margins of the partitions 16 and the grater surfaces 14, 15 and 8 so that the star wheel 17 and the partitions 16 are freely rotatable.

Through a pipe 20 passed through the lid 1 water may be admitted to the receptacle 2 for cleaning the potatoes, the waste water being removed through an outlet 21.

In the operation of the machine the potatoes are brought into the sectional chambers provided between the partition 16 and the grater surfaces 8, 14 and 15, whereupon the crank 9 is operated for turning the cylinder 8 and the bottom 15 while circulating water through the machine. If now one of the potatoes is thrown by centrifugal action against the stationary grater cylinder 14, the grater surface 15 rotating in the direction of the arrow $x$ shown in Fig. 2 imparts rotary movement to the potato about an axis parallel to the axis of the cylinder 14 and in the direction of the arrow $a$ shown in Fig. 3. By the action of the rotary bottom 15 and the resistance of the stationary cylinder 14 the potato is thrown away from the said cylinder and in the direction of the arrow $b$, and it impinges upon the rotary cylinder 8. The direction $b$ of the movement of the potato is opposite to the direction of the movement of the grater cylinder 8, and further the direction of the rotation of the potato about its axis is opposite to the rotary movement which the grater cylinder 8 tends to impart thereto. Therefore the potato impinging upon the cylinder 8 is thoroughly peeled on a large part of its circumferential surface.

If now the potato is carried along by the cylinder 8, it is rotated in opposite direction substantially about an axis parallel to the cylinder, as is shown by the arrow $c$ shown in Fig. 3. Now the potato is thrown away from the cylinder 8 substantially in tangential direction, as is indicated by the arrow $d$, and it strikes against the cylinder 14. In most cases the potato will simultaneously make contact with the bottom 15 rotating in a direction opposite to the direction $d$ of the movement of the potato. In the position IV of the potato the rotary bottom 15 and the cylinder 14 tend to impart rotary movement to the potato in a direction opposite to the rotary movement indicated by the arrow $c$, so that the potato impinging on the cylinder 14 and the bottom 15 is thoroughly peeled, such peeling taking place particularly at the portion of the circumference of the potato located at the bottom side thereof and therefore at another part of the potato as compared to the peeling by the cylinder 8.

In the operation of the machine the partitions 16 prevent accumulation of the potatoes at a certain part of the annular chamber, the said partitions permitting independent movement of the potatoes by being freely rotatable on the shaft 7, but separating the potatoes of the sectional chambers from each other.

In some cases I provide the partitions 16 at one or both sides with grater surfaces, as is shown in Fig. 3 at 22.

In Figs. 4 to 6 I have shown a modification in which the rotary cylinders 8 are replaced with sets of grater members in the form of radially disposed arms adapted to be rotated in a direction opposite to that of the grater bottom.

As shown in the said figures the apparatus consists of a cylindrical receptacle 32 having a lid 31, a lining 43 formed with a grater surface 44, a shaft 33 rotatably mounted in a step bearing 34 and a bearing 35, and a bottom 36 having an annular grater surface 45 and keyed to the shaft 33. Further, a sleeve 37 is rotatably mounted on the shaft 33, and the shaft 33 and sleeve 37 are adapted to be rotated in opposite directions from a hand crank 39 and its shaft 39' through the intermediary of bevel gear wheels 40, 41 and 42. So far the construction is similar to the one described with reference to Figs. 1 to 3.

To the sleeve 37 a disk 53 is secured which carries vertical rods 54 concentrically arranged around the sleeve 37, and on each of the said rods three grater arms 55 are pivotally mounted, spacing sleeves 56 being disposed between the disk 53 and the arms 55 so as to hold the arms the desired distance apart. To the inner ends of the said arms springs 57 are connected which are attached with their opposite ends to a sleeve 58 secured to the sleeve 37. The outer parts of the arms 55 are disposed above the grater surface 45 and they extend nearly to the stationary cylinder 44.

The grater members 55 are U-shaped in cross-section, and they are preferably made from sheet metal. The web 55$^a$ of each arm is curved slightly forwardly, as is shown in Fig. 5, and at the part disposed above the grater surface 45 it is formed with a grater surface 59. The flanges 55$^b$ of each bar are bent towards each other so that the arms are reduced in height at their rear ends as compared to their front ends. The surfaces of the said flanges are smooth.

In the operation of the machine the grater arms 55 are rotated in a direction opposite to that of the grater surface 45. Therefore the potatoes are thrown outwardly and inwardly between the stationary cylinder 44, the bottom 45 and the arms 55 in the same way as has been described with reference to Figs. 1 to 3. In addition they are caught by the grater arms and forced towards the bottom, and the grater arms do not directly yield to the pressure of the potatoes, but they oppose a certain resistance thereto, because the centrifugal action and the tension of the springs 57 tend to hold the grater arms in radial positions. As long as the resistance of the grater arms exceeds that of the potatoes, the potatoes revolve with the arms 55 so that they are not clamped by the arms. If, however, the resistance is reduced the potatoes pass through the groups of grater arms while being effectively peeled by the grater surfaces 59.

Clamping of the potatoes passing through a series of grater arms is prevented by the smooth flanges 55ᵇ of the grater arms providing guide members for the potatoes when being forced backwardly in different degrees, the said guide members preventing parts of the potatoes from getting between two adjacent arms 55.

After the potatoes have passed through a series of grater arms, and the pressure of the grater arms acting thereon has been removed, the potatoes are thrown by the rotary grater surface 45 into the chamber provided between two series of grater arms. Thereby the potatoes change their positions relatively to the grater surfaces, and they are subject to centrifugal action throwing the same against the grater cylinder 44 and into the path of the arms 55 of the next series of grater arms.

The series of grater arms follow the better the shape of the potatoes the more they are subdivided into grater arms, or in other words, the thinner the grater arms are.

In Fig. 7 I have shown a modification in which the grater arms are in the form of thin blades or disks 60 made for example from a suitable abrasive material such as corundum, or wood having a coating of corundum.

In order that the grater arms may more readily pass into the cavities of the potatoes the front edges of the said disks are preferably in the form of waves, as is shown for example in Fig. 8 at 61.

In the construction shown in Figs. 7 to 9 the grater arms 60 of each series are pivotally mounted one above the other on a rod 62. At its top and bottom ends the said rods are connected by short links 66 with rods 64 fixed to a disk 73 adapted to be rotated in a direction opposite to that of the bottom 75, the construction for operating the said parts being similar to the one described with reference to Figs. 1 to 3. For limiting the throw of the grater arms 60 and the links 66 in the direction of the rotation of the disk 73 the links 66 and the disk 73 carry rods 65, 65' providing stops for the arms 60 and the links 66 respectively.

When rotating the disk 73 while the machine is empty the grater arms 60 and the links 66 are set by centrifugal action in radial direction, as is shown in Fig. 7. When potatoes are put into the machine they throw the arms 60 backwardly and around the rods 62 through a certain angle, as is indicated in Fig. 9, and simultaneously the links 66 are slightly turned backwardly around the rods 64. However, the displacement of the arms 60 materially exceeds that of the links, so that the longitudinal axes of the grater arms and the lines connecting the rods 62 and 64 are disposed at a certain angle. Now the arms 60 and the links 66 provide a toggle joint which is acted upon by the centrifugal action tending to stretch the same. After the outer arms of the grater members 60 have been thrown backwardly, the potatoes impinge upon the inner arms, and they exert a pressure on the inner arms while no pressure acts on the outer arms. Therefore the toggle joints 60, 66 are suddenly stretched by the action of the centrifugal force and the pressure of the potatoes acting on the inner arms of the grater members, so that the outer arms of the grater members are violently thrown forwardly and against the potatoes. In this case the potatoes force the grater members backwardly and pass through the series of grater members.

By thus reciprocating the grater arms 60 under the alternate action of the potatoes and the centrifugal action many points of the grater surface are brought to action on the potatoes, and the frictional pressure is increased. Further, when the potatoes pass through the series of grater arms, a large grater surface is brought to action on the potatoes, because by being connected by the links 66 with the rods 64 the said arms are entirely disposed within the chamber containing the potatoes, so that the peeling effect is further increased.

In some cases I provide the cylinders 8 and 14 shown in Figs. 1 to 3 with metal brushes. The cylinder 14 mainly provides an abutment for the potatoes. Therefore the metal brushes afford not only the necessary resistance, but in addition they clean the potatoes. Further, the bottom 6 may be provided with holes for the escape of the cleaning water. In some cases the stationary cylinder is disposed internally of the rotary bottom, while the grater cylinder rotating in opposition to the said bottom is provided circumferentially of the bottom.

I claim:

1. A potato peeling machine, comprising a receptacle having a rotary bottom provided with an abrasive surface and a grater device, and means to rotate said bottom and grater device in opposite directions.

2. A potato peeling machine, comprising a receptacle having a rotary bottom provided with an abrasive surface, grater members disposed within said receptacle one above the other and having independent rocking movement, and means to rotate said bottom and grater members respectively in opposite directions.

3. A potato peeling machine, comprising a receptacle having a rotary bottom provided with an abrasive surface, grater members disposed within said receptacle one above the other, pivotally mounted links on which said grater members are pivotally mounted, supporting means for said links, and means to rotate said bottom and supporting means in opposite directions.

4. A potato peeling machine, comprising a receptacle having a rotary bottom provided with an abrasive surface, grater members disposed within said receptacle one above the other and having independent rocking movement, said grater members being in the form of disks constructed at their outer faces from abrasive material, and means to rotate said bottom and grater members respectively in opposite directions.

5. A potato peeling machine, comprising a receptacle having a rotary bottom provided with an abrasive surface, grater members disposed within said receptacle one above the other and having independent rocking movement, said grater members being in the form of disks made from abrasive material, and means to rotate said bottom and grater members respectively in opposite directions.

6. A potato peeling machine, comprising a receptacle having a rotary bottom provided with an abrasive surface, grater members disposed within said receptacle one above the other and having independent rocking movement, said grater members having their front or operative faces formed with wave-like projections, and means to rotate said bottom and grater members respectively in opposite directions.

7. A potato peeling machine, comprising a receptacle having a rotary bottom provided with an abrasive surface, grater members disposed within said receptacle one above the other and having independent rocking movement about an axis disposed away from the center of gravitation of said members, the eccentricity of said axis relatively to the center of gravitation of the grater members and the mass of said grater members being sufficient for yieldingly holding the same by centrifugal action in operative positions.

In testimony whereof, I hereunto affix my signature.

WOLDEMAR MANNSDORFF.